UNITED STATES PATENT OFFICE.

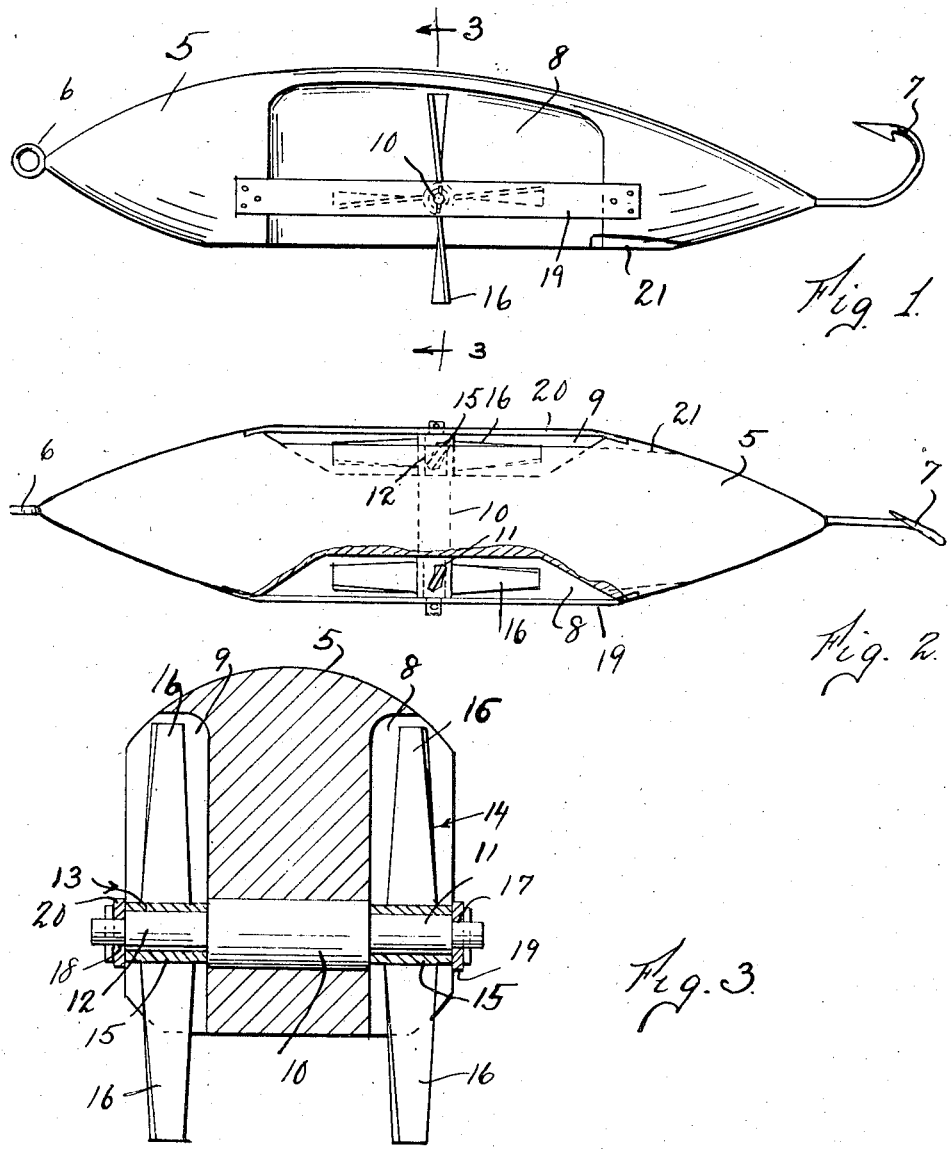

WALTER S. EWERT, OF LOS ANGELES, CALIFORNIA.

ARTIFICIAL BAIT.

1,313,476.          Specification of Letters Patent.      Patented Aug. 19, 1919.

Application filed May 31, 1919. Serial No. 300,884.

*To all whom it may concern:*

Be it known that I, WALTER S. EWERT, a citizen of the United States, and resident of Los Angeles, in the county of Los Angeles, State of California, have invented certain new and useful Improvements in Artificial Bait, of which the following is a specification.

My invention relates to what is known as wiggle bait used in deep sea fishing for game fish, either casting or trolling and the object thereof is to provide a cheap, simple and efficient bait for that purpose.

In the drawings accompanying and forming a part hereof:

Figure 1 is a side elevation of my improved bait.

Fig. 2 is a top plan of Fig. 1, partly broken away.

Fig. 3 is a section on the line 3—3 of Fig. 1.

Referring to the drawings 5 represents the body of my bait which is shaped to represent the body of a small fish such as is the natural prey of the fish it is desired to catch, having a line attaching eyelet 6 at its front end and the usual hook 7 at its rear end. If desired or necessary this hook and eye may be made integral and may extend through the body of the fish longitudinally. Formed in the sides of body member 5 at substantially the longitudinal center thereof are recesses 8 and 9 closed at the top as best shown in Fig. 3, and extending transversely through the body member 5 on the transverse center of said recesses but at a distance below the longitudinal center thereof is an axle 10. Axle 10 is non-revolubly mounted in said body member and has its ends 11 and 12 immediately adjacent the body member reduced in size and mounted on these reduced ends to rotate freely are paddle wheels 13 and 14. Wheels 13 and 14 are composed of a hub 15 and a plurality of radially extending paddles or vanes 16 which paddles or vanes are given a slight twist longitudinally for a purpose hereafter explained. While I have shown my wheels as being provided with four paddles it will be understood that more or less may be used as desired.

The ends of axles 11 and 12 are still further reduced in size at the outer sides of wheels 13 and 14 and these reduced ends are mounted in holes 17 and 18 in supporting bars 19 and 20. Bars 19 and 20 are secured at their ends to the body member 5 at each side of recesses 8 and 9 and serve to support the ends of axle 10 and also to prevent weeds or other foreign matter becoming entangled in the edges of the wheels or paddles. Cut in the under side of body member 5 at the rear end thereof are longitudinally extending grooves 21 which serve to keep the body of the bait straight while in use. It will be noted that the lower side of body member 5 is flattened and also that the paddle wheels are mounted with their axles below the longitudinal center of the body member. This construction has been found very efficient in keeping the bait from turning over or reversing itself while in use and is one of the prime features of my invention.

While I have shown and described the preferred form of my invention it will be understood that I do not limit myself to such preferred form but that various changes and adaptations may be made therein without departing from the spirit of my invention.

Having described my invention what I claim is:

1. In an artificial bait the combination with a fish like body having downwardly and outwardly opening recesses in opposite sides thereof and a line attaching eyelet at one end and a hook at its other end, of a pair of paddle wheels mounted one in each of said recesses to revolve in a plane parallel with the longitudinal center of said body member.

2. In an artificial bait a fish like body provided with downwardly and outwardly opening recesses in opposite sides thereof; an axle rigidly mounted in said body member transversely thereof, the ends of said axle projecting into said recesses; a paddle wheel revolubly mounted on each end of said axle within said recesses to rotate in a plane parallel with the longitudinal plane of said body member; and a supporting bar for the ends of said axle extending across said recesses.

3. In an artificial bait a fish like body provided with downwardly and outwardly opening recesses in opposite sides thereof; and having its lower side flattened; an axle rigidly mounted in said body member transversely thereof on the transverse center of said recesses but at a distance below the longitudinal center thereof; a paddle wheel revolubly mounted on each end of said axle within said recesses; longitudinally extending grooves in the under side of said body member; a hook at the rear end of said body and line attaching means at the other end.

In witness that I claim the foregoing I have hereunto subscribed my name this 19 day of May 1919.

WALTER S. EWERT.